US007008986B2

(12) United States Patent
Dames et al.

(10) Patent No.: US 7,008,986 B2
(45) Date of Patent: *Mar. 7, 2006

(54) STABILIZED THERMOPLASTIC MOULDING MATERIALS

(75) Inventors: Burkhardt Dames, Heppenheim (DE); Bernd Ziegler, Gönnheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 135 days.

This patent is subject to a terminal disclaimer.

(21) Appl. No.: 10/312,780

(22) PCT Filed: Jun. 22, 2001

(86) PCT No.: PCT/EP01/07129

§ 371 (c)(1),
(2), (4) Date: Dec. 30, 2002

(87) PCT Pub. No.: WO02/00780

PCT Pub. Date: Jan. 3, 2002

(65) Prior Publication Data

US 2003/0195296 A1 Oct. 16, 2003

(30) Foreign Application Priority Data

Jun. 29, 2000 (DE) ................. 100 30 553

(51) Int. Cl.
  *C08K 5/29* (2006.01)
  *C08K 3/04* (2006.01)
(52) U.S. Cl. ............ 524/186; 524/593; 523/461; 525/398; 525/403; 525/407; 525/540; 528/422; 528/423
(58) Field of Classification Search ........ 525/398, 525/403, 407, 540; 523/461; 528/422, 423; 524/186, 593
See application file for complete search history.

(56) References Cited

U.S. PATENT DOCUMENTS

| | | | | |
|---|---|---|---|---|
| 3,607,544 A | * | 9/1971 | Earner et al. ............ 156/308.6 |
| 3,687,898 A | * | 8/1972 | Ishii et al. .................. 525/400 |
| 4,046,843 A | | 9/1977 | Sano et al. |
| 4,386,178 A | | 5/1983 | Schuette et al. |
| 4,689,373 A | * | 8/1987 | Auerbach et al. ........... 525/398 |
| 4,837,400 A | | 6/1989 | Walter et al. |
| 5,128,405 A | * | 7/1992 | Sugiyama ................... 524/538 |
| 5,362,784 A | | 11/1994 | Brodie, III et al. |
| 5,500,477 A | * | 3/1996 | Reuschel et al. ........... 525/398 |
| 5,779,954 A | | 7/1998 | Tinant et al. |
| 6,191,222 B1 | | 2/2001 | Keller et al. |
| 6,329,448 B1 | * | 12/2001 | Gutsche et al. ............. 523/319 |
| 6,489,388 B1 | * | 12/2002 | Kurz et al. ................. 524/432 |

FOREIGN PATENT DOCUMENTS

| | | |
|---|---|---|
| DE | 27 02 661 | 8/1977 |
| DE | 30 11 280 | 2/1981 |
| DE | 36 28 561 | 3/1988 |
| DE | 36 28 562 | 3/1988 |
| DE | 196 02545 | 8/1997 |
| EP | 19 761 | 12/1980 |
| EP | 855 424 | 7/1998 |
| EP | 992 541 | 4/2000 |

OTHER PUBLICATIONS

Ullmann's Encyclopedia of Ind. Chem. 6$^{th}$ Ed., 1999.
XP-002188723, Oct. 1996 Fukamashi et al.

* cited by examiner

*Primary Examiner*—Jeffrey B. Robertson
(74) *Attorney, Agent, or Firm*—Novak Druce & Quigg

(57) ABSTRACT

The invention relates to thermoplastic moulding materials containing A) 29 to (100 wt. % minus 1 ppb) of at least one thermoplastic polymer. B) 1 ppb to 1 wt. % or at least one polyethyleneimine homopolymer of copolymer, as well as C) 0 to 70 wt. % of other additives, as the essential constituents thereof. The weight percent of constituents A) to C) amounts to 100% in every case.

5 Claims, No Drawings

STABILIZED THERMOPLASTIC MOULDING MATERIALS

The invention relates to thermoplastic molding compositions comprising, as substantive components, A) from 29% by weight to (100% minus 1 ppb) of at least one thermoplastic polymer,
B) from 1 ppb to 1% by weight of at least one polyethyleneimine homo- or copolymer, and also
C) from 0 to 70% by weight of other additives, where the percentages by weight of components A) to C) always give 100%.

The invention further relates to the use of the molding compositions of the invention for producing moldings of any type, and also to the resultant moldings of any type. In addition, the invention relates to a process for increasing the thermal stability of polyoxymethylenes, in particular when exposed to high temperatures, and/or by increasing their diesel-fuel resistance. It also relates to the resultant polyoxymethylene moldings. The invention further relates to the use of polyethyleneimine homo- or copolymers for increasing thermal stability of polyoxymethylenes, in particular when exposed to high temperatures, and/or increasing their diesel-fuel resistance.

The stabilization of thermoplastics, in particular polyoxyethylene molding compositions, by suitable additives is prior art. Antioxidants, e.g. sterically hindered phenol derivatives, are examples of additives used for this purpose. Phenol derivatives of this type are described in DE-A-27 02 661, for example. EP-A-19 761 teaches the incorporation of alkoxymethylmelamines in glass-fiber-reinforced polyoxymethylene molding compositions to improve their toughness. According to EP-A-52 740, adding a partially etherified specific melamine-formaldehyde condensation product stabilizes polyoxymethylene molding compositions with respect to the action of heat at from 100 to 150° C. over prolonged periods. DE-A-3 011 280 describes stabilized oxymethylene copolymer compositions in which the stabilizer comprises a mixture made from at least one amino-substituted triazine, at least one sterically hindered phenol, and at least one metal-containing compound. These metal-containing compounds are preferably composed of potassium hydroxide, calcium hydroxide, magnesium hydroxide, or magnesium carbonate.

However, despite these measures, the thermal stability of known polyoxymethylene molding compositions is not sufficient for some applications and has a disadvantageous effect on processing to give moldings and, for example, contributes to the formation of deposits on the mold or to impairment of mold release, and/or causes discoloration and fall-off in mechanical properties during subsequent use of the moldings. Another disadvantage is that the mixture may still contain formaldehyde adducts which can cause odor problems due to release of formaldehyde during processing at elevated temperatures.

DE-A 36 28 560, DE-A 36 28 561 and DE-A 36 28 562 disclose polyoxymethylene molding compositions in which the stabilizers comprise a mixture made from sterically hindered phenols and alkaline earth metal silicates and alkaline earth metal glycerophosphates. According to the description, polyamides may also be used as further costabilizers. Although these compositions have better thermal stability, their quality of color is still unsatisfactory.

Thermoplastics with high crystallinity have good resistance to numerous chemicals, and particular emphasis is given here to their high resistance to fuel (including those in which methanol is present), fats, oils, brake fluids and coolants. Polyacetal, for example, exhibits only slight swelling and therefore high dimensional stability. The good molding shrinkage of polyacetal (compared with other engineering thermoplastics) is utilized in the production of reservoir casings (fuel-extraction equipment), since the plug connectors integrated into this application have to be highly leakproof. At the same time, the material used for the reservoir casing has to have high elongation at break in order to fulfill the crash requirements imposed by legislation. Here, too, polyacetal is again the material of choice for the desired high heat resistance in the region of the fuel supply and fuel return systems.

The trend in the automotive sector toward developing engines which are ever more powerful but at the same time more economical has caused specific and unexpected problems in the diesel vehicle sector. To achieve optimized combustion of diesel fuels the diesel fuel is atomized at pressures around 1300 bar. This is followed by a sudden pressure reduction to 1 bar. When this procedure is used in what is known as the common rail system, short-lived temperatures up to 160° C. can occur in the engine compartment. Consequently, the temperature of all of the parts which come into contact with the diesel fuel rises markedly, and mixing of cold fuel from the tank with hot fuel from the region of the engine within the fuel supply and fuel return system produces temperatures around 90° C. Even in the region of the tank, it is still possible for temperatures above 90° C. to arise, since the fuel injection system returns excess diesel fuel, which is still hot, into the tank. Under these conditions polyacetal decomposes and deposits within the lines, making these brittle and also impassable for the diesel fuel.

In addition, sulfur and/or sulfur compounds are present in diesel fuels and also damage the POM matrix, since in particular acid sulfur compounds are produced in the presence of air and degrade the polymer.

These sulfur compounds are also found in motor vehicle parts in which vulcanized elastomers are present or which are encapsulated within elastomers of this type (e.g. bearing elements in the operating [sic] area or steering area, which have elastomer sleeves for dust protection.

EP-A 855 424 proposes sterically hindered amines as additives. Disadvantages here are the poorer color properties of the polyoxymethylene, and also the use of relatively large amounts of an expensive additive.

Polyethylenimines are likewise known per se and are used in papermaking: they aggregate the paper fibers and bind undesirable minor components, i.e. are used as aggregators and as flocculators and complexers, improving the wet strength of the paper. Polyethyleneimines are also used in the production of colorants and coatings, and for water treatment, and also as adhesive layers in laminated polypropylene composite films, and in the production of petroleum and of natural gas, and finally for immobilizing enzymes. See Ullmann's Encyclopedia of Industrial Chemistry, $6^{th}$ Edtn., 1999 Electronic Release, Verlag VCH Weinheim, keyword "Aziridines", Chap. 6 "Uses" (referred to below as "Ullmann Electronic Release"). The use of polyethyleneimines as a constituent of thermoplastic molding compositions has not been disclosed.

It is an object of the present invention, therefore, to provide thermoplastic molding compositions which have higher thermal stability, in particular when exposed to high temperatures, and at the same time have good color properties and higher diesel-fuel resistance.

We have found that this object is achieved by means of the molding compositions defined at the outset, preferred embodiments are given in the subclaims.

In addition, the use of these molding compositions for producing moldings of any type have been found, as have the resultant moldings, and also a process for increasing the thermal stability and/or diesel-fuel resistance of polyoxymethylenes, POM moldings obtainable in this way, and the use of polyethyleneimines for increasing the thermal stability and/or diesel-fuel resistance of polyoxymethylenes.

As component A), the molding compositions of the invention comprise from 29% by weight to (100% by weight minus 1 ppb) of at least one thermoplastic polymer. The proportion of A) is preferably from 40% by weight to (100% by weight minus 1 ppm), and in particular from (50% by weight minus 500 ppm) to (100% by weight minus 1 ppm). These data are based on the molding compositions A) to C). ppb means parts per billion (by weight)=$1:10^9$, and ppm means parts per million (by weight)=$1:10^6$.

The term (100% by weight minus 1 ppb) means the proportion in percent by weight obtained when 1 ppb is substrated from 100% by weight. The term is written in this way for reasons of clarity rather than as 99.999 . . . with a large number of nines after the decimal point. The same applies to the terms (100% by weight minus 1 ppm) and (100% by weight minus 500 ppm).

In principle, the advantageous effect is apparent in the molding compositions of the invention with thermoplastics of any type. An example of a list of suitable thermoplastics is found in Kunststoff-Taschenbuch (Ed. Saechtling), 1989 Edition, which also provides sources for reference. Processes for preparing these thermoplastics are known per se to the skilled worker. Some further detail is given below of some preferred types of plastic.

1. Polycarbonates and Polyesters

Use is generally made of polyesters A) based on aromatic dicarboxylic acids and on an aliphatic or aromatic dihydroxy compound.

A first group of preferred polyesters is that of polyalkylene terephthalates having in particular from 2 to 10 carbon atoms in the alcohol moiety.

Polyalkylene terephthalates of this type are known per se and are described in the literature. Their main chain contains an aromatic ring which derives from the aromatic dicarboxylic acid. There may also be substitution in the aromatic ring, e.g. by halogen, such as chlorine or bromine, or by $C_1$–$C_4$-alkyl, such as methyl, ethyl, iso- or n-propyl, or n-, iso- or tert-butyl.

These polyalkylene terephthalates may be prepared by reacting aromatic dicarboxylic acids, or their esters or other ester-forming derivatives, with aliphatic dihydroxy compounds in a manner known per se.

Preferred dicarboxylic acids are 2,6-naphthalenedicarboxylic acid, terephthalic acid and isophthalic acid, and mixtures of these. Up to 30 mol %, preferably not more than 10 mol %, of the aromatic dicarboxylic acids may be replaced by aliphatic or cycloaliphatic dicarboxylic acids, such as adipic acid, azelaic acid, sebacic acid, dodecanedioic acids and cyclohexanedicarboxylic acids.

Preferred aliphatic dihydroxy compounds are diols having from 2 to 6 carbon atoms, in particular 1,2-ethanediol, 1,3-propanediol, 1,4-butanediol, 1,6-hexanediol, 1,4-hexanediol, 1,4-cyclohexanediol, 1,4-cyclohexanedimethanol and neopentyl glycol, and mixtures of these.

Particularly preferred polyesters (A) are polyalkylene terephthalates derived from alkanediols having from 2 to 6 carbon atoms. Among these, particular preference is given to polyethylene terephthalate, polypropylene terephthalate and polybutylene terephthalate, and mixtures of these. Preference is also given to PET and/or PBT which comprise as other monomer units, up to 1% by weight, preferably up to 0.75% by weight, of 1,6-hexanediol and/or 2-methyl-1,5-pentanediol.

The viscosity number of the polyesters (A) is generally in the range from 50 to 220, preferably from 80 to 160 (measured in 0.5% strength by weight solution in a phenol/o-dichlorobenzene mixture (in a weight ratio of 1:1) at 25° C.) to ISO 1628.

Particular preference is given to polyesters whose carboxyl end group content is up to 100 mval/kg of polyester, preferably up to 50 mval/kg of polyester and in particular up to 40 mval/kg of polyester. Polyesters of this type may be prepared, for example, by the process of DE-A 44 01 055. The carboxyl end group content is usually determined by titration methods (e.g. potentiometry).

Particularly preferred molding compositions comprise, as component A), a mixture of polyesters other than PBT, for example polyethylene terephthalate (PET) and/or polycarbonate. An example of the proportion of the polyethylene terephthalate and/or the polycarbonate in the mixture is preferably up to 50% by weight, in particular from 10 to 30% by weight, based on 100% by weight of A).

It is also advantageous, if desired, to use recycled PET materials (also termed scrap PET) in a mixture with polyalkylene terephthalates, such as PBT.

Recycled materials are generally:

1) those known as post-industrial recycled materials: these are production wastes during polycondensation or during processing, e.g. sprues from injection molding, start-up material from injection molding or extrusion, or edge trims from extruded sheets or films.

2) Post-consumer recycled materials: these are plastic items which are collected and treated after utilization by the end consumer. Blow-molded PET bottles for mineral water, soft drinks and juices are easily the predominant items in terms of quantity.

Both types of recycled material may be used either as regrind or in the form of pellets. In the latter case, the crude recycled materials are isolated and purified and then melted and pelletized using an extruder. This usually facilitates handling and free-flowing properties, and metering for further steps in processing.

The recycled materials used may either be pelletized or in the form of regrind. The edge length should not be more than 6 mm and should preferably be less than 5 mm.

Because polyesters undergo hydrolytic cleavage during processing (due to traces of moisture) it is advisable to predry the recycled material. The residual moisture after drying is preferably from 0.01 to 0.7%, in particular from 0.2 to 0.6%.

Another class to be mentioned is that of fully aromatic polyesters deriving from aromatic dicarboxylic acids and aromatic dihydroxy compounds.

Suitable aromatic dicarboxylic acids are the compounds previously described for the polyalkylene terephthalates. The mixtures preferably used are made from 5 to 100 mol % of isophthalic acid and from 0 to 95 mol % of terephthalic acid, in particular from about 50 to about 80% of terephthalic acid and from 20 to about 50% of isophthalic acid.

The aromatic dihydroxy compounds preferably have the formula

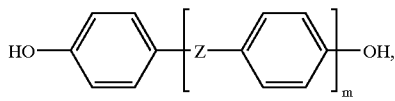

where Z is alkylene or cycloalkylene having up to 8 carbon atoms, arylene having up to 12 carbon atoms, carbonyl, sulfonyl, oxygen or sulfur or a chemical bond, and where m is from 0 to 2. The phenylene groups in the compounds may also have substitution by $C_1$–$C_6$-alkyl or alkoxy and fluorine, chlorine or bromine.

Examples of parent compounds for these compounds are dihydroxydiphenyl,
di(hydroxyphenyl)alkane,
di(hydroxyphenyl)cycloalkane,
di(hydroxyphenyl)sulfide,
di(hydroxyphenyl)ether,
di(hydroxyphenyl)ketone,
di(hydroxyphenyl)sulfoxide,
α,α'-di(hydroxyphenyl)dialkylbenzene,
di(hydroxyphenyl)sulfone, di(hydroxybenzoyl)benzene, resorcinol, and
hydroquinone, and also the ring-alkylated and
ring-halogenated derivatives of these.

Among these, preference is given to
4,4'-Dihydroxydiphenyl,
2,4-di(4'-hydroxyphenyl)-2-methylbutane,
α,α'-di(4-hydroxyphenyl)-p-diisopropylbenzene,
2,2-di(3'-methyl-4'-hydroxyphenyl)propane, and
2,2-di(3'-chloro-4'-hydroxyphenyl)propane, and in particular to
2,2-di(4'-hydroxyphenyl)propane
2,2-di(3',5-dichlorodihydroxyphenyl)propane,
1,1-di(4'-hydroxyphenyl)cyclohexane,
3,4'-dihydroxybenzophenone,
4,4'-dihydroxydiphenyl sulfone and
2,2-di(3',5'-dimethyl-4'-hydroxyphenyl)propane or mixtures of these.

It is, of course, also possible to use mixtures of polyalkylene terephthalates and fully aromatic polyesters and/or polycarbonates. These generally comprise from 20 to 98% by weight, preferably from 50 to 96% by weight of the polyalkylene terephthalate and from 2 to 80% by weight, preferably 4 to 50% by weight of the fully aromatic polyester and/or the polycarbonate.

It is, of course, also possible to use polyester block copolymers, such as copolyetheresters. Products of this type are known per se and are described in the literature, e.g. in U.S. Pat. No. 3,651,014. Corresponding products are also available commercially, e.g. Hytrel® (DuPont).

Other preferred components A) are halogen-free polycarbonates. Examples of suitable halogen-free polycarbonates are those based on diphenols of the formula

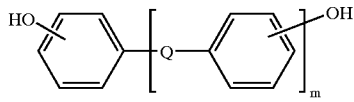

where Q is a single bond, $C_1$–$C_8$-alkylene, $C_2$–$C_3$-alkylidene, $C_3$–$C_6$-cycloalkylidene, $C_6$–$C_{12}$-arylene or else —O—, —S— or —SO$_2$—, and m is an integer from 0 to 2.

The phenylene radicals of the biphenols may also have substituents, such as $C_1$–$C_6$-alkyl or $C_1$–$C_6$-alkoxy.

Examples of preferred biphenols of this formula are hydroquinone, resorcinol, 4,4'-dihydroxydiphenyl, 2,2-bis(4-hydroxyphenyl)propane, 2,4-bis(4-hydroxyphenyl)-2-methylbutane and 1,1-bis(4-hydroxyphenyl)cyclohexane. Particular preference is given to 2,2-bis(4-hydroxyphenyl)propane and 1,1-bis(4-hydroxyphenyl)cyclohexane, and also to 1,1-bis(4-hydroxyphenyl)-3,3,5-trimethylcyclohexane.

Either homopolycarbonates or copolycarbonates are suitable as component A, and preference is given to the copolycarbonates of bisphenol A, as well as to bisphenol A homopolymer.

Suitable polycarbonates may be branched in a known manner, specifically and preferably by incorporating from 0.05 to 2.0 mol %, based on the total of the biphenols used, of at least trifunctional compounds, for example those having three or more phenolic OH groups.

Polycarbonates which have proven particularly suitable have relative viscosities $\eta_{rel}$ of from 1.10 to 1.50, in particular from 1.25 to 1.40. This corresponds to an average molecular weight $M_w$ (weight average) of from 10,000 to 200,000, preferably from 20,000 to 80,000.

The biphenols of this formula are known per se or can be prepared by known processes.

The polycarbonates may, for example, be prepared by reacting the biphenols with phosgene in the interfacial process, or with phosgene in the homogeneous-phase process (known as the pyridine process), and in each case the desired molecular weight may be achieved in a known manner by using an appropriate amount of known chain terminators. (In relation to polydiorganosiloxane-containing polycarbonates see, for example, DE-A 33 34 782).

Examples of suitable chain terminators are phenol, p-tert-butylphenol, or else long-chain alkylphenols, such as 4-(1,3-tetramethylbutyl)phenol, as in DE-A 28 42 005, or monoalkylphenols, or dialkylphenols with a total of from 8 to 20 carbon atoms in the alkyl substituents, and in DE-A 35 06 472, such as p-nonylphenyl [sic], 3,5-di-tert-butylphenol, p-tert-octylphenol, p-dodecylphenol, 2-(3,5-dimethylheptyl)phenol and 4-(3,5-dimethylheptyl)phenol.

For the purposes of the present invention, halogen-free polycarbonates are polycarbonates made from halogen-free biphenols, from halogen-free chain terminators and, if desired, from halogen-free branching agents, where the content of subordinate amounts at the ppm level of hydrolyzable chlorine, resulting, for example, from the preparation of the polycarbonates with phosgene in the interfacial process, is not regarded as meriting the term halogen-containing for the purposes of the invention. Polycarbonates of this type with contents of hydrolyzable chlorine at the ppm level are halogen-free polycarbonates for the purposes of the present invention.

Other suitable components A) which may be mentioned are amorphous polyester carbonates, where phosgene has been replaced, during the preparation, by aromatic dicarboxylic acid units, such as isophthalic acid and/or terephthalic acid units. For further details reference may be made at this point to EP-A 711 810.

Other suitable copolycarbonates with cycloalkyl radicals as monomer units have been described in EP-A 365 916.

It is also possible to replace bisphenol A with bisphenol TMC. Polycarbonates of this type are commercially available from Bayer with the trademark APEC HT®.

2. Polyamides

The polyamides of the molding compositions of the invention generally have a viscosity number of from 90 to 350 ml/g, preferably from 110 to 240 ml/g, determined in 0.5% strength by weight solution in 96% strength by weight sulfuric acid at 25° C. to ISO 307.

Preference is given to semicrystalline or amorphous resins with molecular weight (weight-average) of at least 5000, e.g. as described in U.S. Pat. Nos. 2,071,250, 2,071,251, 2,130, 523, 2,130,948, 2,241,322, 2,312,966, 2,512,606 and 3,393, 210.

Examples of these are polyamides which derive from lactams having from 7 to 13 ring members, for example polycaprolactam, polycaprylolactam and polylaurolactam, and also polyamides obtained by reacting dicarboxylic acids with diamines.

Dicarboxylic acids which may be used are alkanedicarboxylic acids having from 6 to 12 carbon atoms, in particular from 6 to 10 carbon atoms, and aromatic dicarboxylic acids. Merely as examples, mention may be made here of adipic acid, azelaic acid, sebacic acid, dodecanedioc acid, and terephthalic and isophthalic acids.

Particularly suitable diamines are alkanediamines having from 6 to 12 carbon atoms, in particular from 6 to 8 carbon atoms, and also m-xylylenediamine, di(4-aminophenyl) methane, di(4-aminocyclohexyl)methane, 2,2-di(4-aminophenyl)propane, and 2,2-di(4-aminocyclohexyl)propane.

Preferred polyamides are polyhexamethyleneadipamide, polyhexamethylenesebacamide and polycaprolactam, also nylon-6/6,6, in particular with a proportion of from 5 to 95% by weight of caprolactam units.

Mention may also be made of polyamides obtained, for example, by condensing 1,4-diaminobutane with adipic acid at an elevated temperature (nylon-4,6). Preparation processes for polyamides of this structure are described in EP-A 38 094, EP-A 38 582 and EP-A 39 524, for example.

Polyamides obtainable by copolymerizing two or more of the abovementioned monomers, or mixtures of two or more polyamides in any desired mixing ratio are also suitable.

Semiaromatic copolyamides whose triamine content is below 0.5% by weight, preferably below 0.3% by weight, for example nylon-6/6,T or nylon-6,6/6,T, have also proven particularly advantageous (see EP-A 299 444).

The processes described in EP-A 129 195 and 129 196 can be used to prepare the preferred semiaromatic copolyamides having low triamine content.

3. Polyphenylene Ethers

Suitable polyphenylene ethers generally have a molecular weight (weight-average) in the range from 10,000 to 80,000, preferably from 20,000 to 60,000, and in particular from 40,000 to 55,000.

The molecular weight distribution is generally determined by gel permeation chromatography (GPC). For this, PPE specimens are dissolved in THF under pressure at 110° C. 0.16 ml of a 0.25% strength solution is injected at room temperature onto suitable separating columns using THF as eluent. A UV detector is generally used. The separating columns are usefully calibrated with PPE specimens of known molecular weight distribution.

This corresponds to a reduced specific viscosity $\eta_{red}$ of from 0.2 to 0.9 dl/g, preferably from 0.35 to 0.8 dl/g, and in particular from 0.45 to 0.6 dl/g, measured on a 0.5% strength by weight solution in chloroform at 25° C.

The unmodified polyphenylene ethers $a_1$) are known per se and are preferably prepared by oxidative coupling of ortho-disubstituted phenols.

Substituents which may be mentioned as examples are halogen atoms, such as chlorine or bromine, and alkyl having from 1 to 4 carbon atoms and preferably having no α-positioned tertiary hydrogen atom, e.g. methyl, ethyl, propyl, or butyl. The alkyl radicals may in turn have substitution by halogen atoms, such as chlorine or bromine, or by a hydroxyl group. Other examples of possible substituents are alkoxy, preferably having up to 4 carbon atoms, and phenyl, either unsubstituted or substituted by halogen atoms and/or by alkyl groups.

Copolymers of different phenols are also suitable, e.g. copolymers of 2,6-dimethylphenol and 2,3,6-trimethylphenol. It is, of course, also possible to use mixtures of different polyphenylene ethers.

The polyphenylene ethers used as component $a_1$) may, where appropriate, have defects arising from the preparation process, for example those described by White et al., Macromolecules 23, 1318–1329 (1990).

The polyphenylene ethers used are preferably those which are compatible with vinylaromatic polymers, i.e. are completely or very substantially soluble in those polymers (cf. A. Noshay, Block Copolymers, pp. 8–10, Academic Press, 1977 and O. Olabisi, Polymer-Polymer Miscibility, 1979, pp. 117–189).

Examples of polyphenylene ethers are
poly(2,6-dilauryl-1,4-phenylene ether),
poly(2,6-diphenyl-1,4-phenylene ether),
poly(2,6-dimethoxy-1,4-phenylene ether),
poly(2,6-diethoxy-1,4-phenylene ether),
poly(2-methoxy-6-ethoxy-1,4-phenylene ether),
poly(2-ethyl-6-stearyloxy-1,4-phenylene ether),
poly(2,6-dichloro-1,4-phenylene ether),
poly(2-methyl-6-phenyl-1,4-phenylene ether),
poly(2,6-dibenzyl-1,4-phenylene ether),
poly(2-ethoxy-1,4-phenylene ether),
poly(2-chloro-1,4-phenylene ether), and
poly(2,5-dibromo-1,4-phenylene ether). It is preferred to use polyphenylene ethers whose substituents are alkyl having from 1 to 4 carbon atoms, for example
poly(2,6-dimethyl-1,4-phenylene ether),
poly(2,6-diethyl-1,4-phenylene ether),
poly(2-methyl-6-ethyl-1,4-phenylene ether),
poly(2-methyl-6-propyl-1,4-phenylene ether),
poly(2,6-dipropyl-1,4-phenylene ether), and
poly(2-ethyl-6-propyl-1,4-phenylene ether).

Graft copolymers made from polyphenylene ether and from vinylaromatic polymers, such as styrene, α-methylstyrene, vinyltoluene or chlorostyrene, are also suitable.

Functionalized or modified polyphenylene ethers are known per se, e.g. from WO-A 86/02086, WO-A 87/00540, EP-A-222 246, EP-A-223 116 and EP-A-254 048, and their use is preferred for mixtures with PA or polyester.

An unmodified polyphenylene ether $a_1$) is usually modified by incorporating at least one carbonyl, carboxylic acid, anhydride, carboxamide, carboximide, carboxylic ester, carboxylate, amino, hydroxyl, epoxy, oxazoline, urethane, urea, lactam or halobenzyl group, so as to ensure sufficient compatibility, e.g. with the polyamide.

The modification is generally carried out by reacting an unmodified polyphenylene ether $a_1$) with a modifier which contains at least one of the abovementioned groups and at least one carbon-carbon double bond or carbon-carbon triple bond, in solution (WO-A 86/2086), in aqueous dispersion, in a gas-phase process (EP-A-25 200), or in the melt, where appropriate in the presence of suitable vinylaromatic polymers or impact modifiers, and free-radical initiators may be present here if desired.

Examples of suitable modifiers ($a_3$) are maleic acid, methylmaleic acid, itaconic acid, tetrahydrophthalic acid, anhydrides and imides thereof, fumaric acid, and the mono- and diesters of these acids, e.g. of $C_1$ alkanols or of $C_2$–$C_8$ alkanols ($a_{31}$), the mono- and diamides of these acids, such as N-phenylmaleimide (monomers $a_{32}$) and maleic hydrazide. Other examples which may be mentioned are N-vinylpyrrolidone and (meth)acryloylcaprolactam ($a_{33}$).

The component A) used in the molding compositions of the invention is preferably a modified polyphenylene ether obtainable by reacting $a_1$) from 70 to 99.95% by weight, preferably from 76.5 to 99.94% by weight, of an unmodified polyphenylene ether, $a_2$) from 0 to 25% by weight, preferably from 0 to 20% by weight, of a vinylaromatic polymer, $a_3$) from 0.05 to 5% by weight, preferably from 0.05 to 2.5% by weight, of at least one compound selected from the group consisting of $a_{31}$) any $\alpha,\beta$-unsaturated dicarbonyl compound, $a_{32}$) any monomer containing amide groups and having a polymerizable double bond, and $a_{33}$) any monomer containing lactam groups and having a polymerizable double bond, and $a_4$) from 0 to 5% by weight, preferably from 0.01 to 0.09% by weight, of a free-radical initiator, where the percentages by weight are based on the total of $a_1$) to $a_4$), for from 0.5 to 15 minutes at from 240 to 375° C. in a suitable mixing or kneading assembly, such as a twin-screw extruder.

The vinylaromatic polymer $a_2$) is preferably to be compatible with the polyphenylene ether used, as described above under 2.

Examples of preferred vinylaromatic polymers compatible with polyphenylene ethers can be found in the above-mentioned monograph by Olabisi, pp. 224–230 and 245.

Free-radical initiators $a_4$) which may be mentioned are: Di(2,4-dichlorobenzoyl) peroxide, tert-butyl peroxide, di(3,5,5-trimethylhexanol) peroxide [sic], dilauroyl peroxide, didecanoyl peroxide, dipropionyl peroxide, dibenzoyl peroxide, tert-butyl peroxy-2-ethylhexoate, tert-butyl peroxydiethylacetate, tert-butyl peroxyisobutyrate, 1,1-di-tert-butylperoxy-3,3,5-trimethylcyclohexane, tert-butylperoxy isopropyl carbonate, tert-butylperoxy 3,3,5-trimethylhexoate, tert-butyl peracetate, tert-butyl perbenzoate, butyl 4,4-di-tert-butylperoxyvalerate, 2,2-di-tert-butylperoxybutane, dicumyl peroxide, tert-butyl cumyl peroxide, 1,3-di(tert-butylperoxyisopropyl)benzene, and di-tert-butyl peroxide. Mention may also be made of organic hydroperoxides, such as diisopropylbenzene monohydroperoxide, cumene hydroperoxide, tert-butyl hydroperoxide, p-methyl hydroperoxide, and pinane hydroperoxide, and highly-branched alkanes of the structure

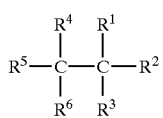

where $R^1$ to $R^6$ are alkyl having from 1 to 8 carbon atoms, alkoxy having from 1 to 8 carbon atoms, aryl, such as phenyl or naphthyl, or 5- or 6-membered heterocycles with a $\pi$ electron system and with nitrogen, oxygen or sulfur as heteroatoms. The substituents $R^1$ to $R^6$ may in turn have substitution by functional groups, such as carboxyl groups, carboxyl derivative groups, hydroxyl groups, amino groups, thiol groups or epoxy groups. Examples of these compounds are 2,3-dimethyl-2,3-diphenylbutane, 3,4-dimethyl-3,4-diphenylhexane, and 2,2,3,3-tetraphenylbutane.

Particularly preferred polyphenylene ethers A) in the molding compositions of the invention are obtained by modifying with maleic acid, maleic anhydride and fumaric acid. Polyphenylene ethers of this type preferably have an acid value of from 1.8 to 3.2, in particular from 2.0 to 3.0.

The acid value is a measure of the degree of modification of the polyphenylene ether, and is generally determined by titration with bases under inert gas conditions.

The acid value generally corresponds to the amount of base in mg needed (according to DIN 53 402) to neutralize 1 g of a polyphenylene ether B) [sic] which has been acid-modified in this way.

4. Polyoxymethylenehomo- or Copolymers

Polymers of this type are known per se to the skilled worker and are described in the literature.

These polymers very generally have at least 50 mol % of recurring —$CH_2O$— units in their main polymer chain.

The homopolymers are generally prepared by polymerizing formaldehyde or trioxane, preferably in the presence of suitable catalysts.

For the purposes of the invention, component A is preferably polyoxymethylene copolymers, especially those which, besides the recurring —$CH_2O$— units, also have up to 50 mol %, preferably from 0.1 to 20 mol %, in particular from 0.3 to 10 mol %, and very particularly preferably from 2 to 6 mol %, of repeat units

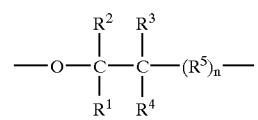

where $R^1$ to $R^4$, independently of one another, are hydrogen, $C_1$–$C_4$-alkyl or halogen-substituted alkyl having from 1 to 4 carbon atoms, and $R^5$ is —$CH_2$—, —$CH_2O$—, $C_1$–$C_4$-alkyl- or $C_1$–$C_4$-haloalkyl-substituted methylene or a corresponding oxymethylene group, and n is from 0 to 3. These groups may be advantageously introduced into the copolymers by ring-opening of cyclic ethers. Preferred cyclic ethers have the formula

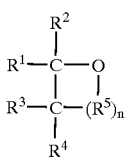

where $R^1$ to $R^5$ and n are as defined above. Mention may be made, merely as examples, of ethylene oxide, propylene 1,2-oxide, butylene 1,2-oxide, butylene 1,3-oxide, 1,3-dioxane, 1,3-dioxolane and 1,3-dioxepan as cyclic ethers, and also linear oligo- and polyformals, such as polydioxolane or polydioxepan as comonomers.

Other suitable components A) are oxymethylene terpolymers, prepared, for example, by reacting trioxane, one of the cyclic ethers described above and a third monomer, preferably bifunctional compounds of the formula

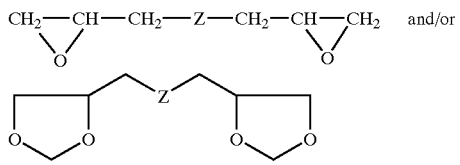

where Z is a chemical bond, —O—, —ORO— (R=$C_1$-$C_8$-alkylene or $C_2$-$C_8$-cycloalkylene).

Preferred monomers of this type are ethylene diglycide, diglycidyl ether and diethers made from glycidyl compounds and formaldehyde, dioxane or trioxane in a molar ratio of 2:1, and also diethers made from 2 mol of glycidyl compound and 1 mol of an aliphatic diol having from 2 to 8 carbon atoms, for example the diglycidyl ether of ethylene glycol, 1,4-butanediol, 1,3-butanediol, 1,3-cyclobutanediol, 1,2-propanediol or 1,4-cyclohexanediol, to mention merely a few examples.

Processes for preparing the homo- and copolymers described above are known to the person skilled in the art and described in the literature, and further details are therefore superfluous here.

The preferred polyoxymethylene copolymers have melting points of at least 150° C. and molecular weights (weight-average) $M_w$ in the range from 5000 to 200,000, preferably from 7000 to 150,000.

Particular preference is given to end-group-stabilized polyoxymethylene polymers which have C—C bonds at the ends of the chains.

The component A) used may in particular also be products which still contain a relatively high proportion (generally >0.1% by weight) of thermally unstable fractions. Components C) and D) have particularly excellent stabilizing action on crude polyoxymethylene type if they are premixed with the polyoxymethylene prior to the mixing process.

5. Thermoplastic Polyurethanes

Other suitable thermoplastics which may be mentioned are thermoplastic polyurethanes (TPUs), as described in EP-A 115 846 and EP-A 115 847, and also EP-A 117 664, for example.

6. Further Thermoplastics

Other suitable polymers which may be mentioned are polyolefins, such as polyethylene homo- or copolymers and/or polypropylene homo- or copolymers, and also polyketones, polyarylene ethers (known as HT thermoplastics), and in particular polyether sulfones, polyvinyl chlorides, poly(meth)acrylates, and also mixtures (blends) made from any of the thermoplastics listed above.

According to the invention, the thermoplastic molding compositions comprise, as component B), from 1 ppb to 1% by weight of at least one polyethyleneimine homopolymer or polyethyleneimine copolymer. The proportion of B) is preferably from 1 ppm to 0.1% by weight, and in particular from 1 ppm to 500 ppm. These data are based on the molding composition made from A) to C). The terms ppb and ppm have been defined above under component A).

For the purposes of the present invention, polyethyleneimines are either homo- or copolymers, prepared by the processes in Ullmann Electronic Release under the keyword Aziridines or as in WO-A 94/12560, for example.

The homopolymers are generally obtainable by polymerizing ethyleneimine (aziridine) in aqueous or organic solution in the presence of acid-releasing compounds, acids or Lewis acids. Homopolymers of this type are branched polymers which generally contain primary, secondary and tertiary amino groups in a ratio of about 30%:40%:30%. The distribution of the amino groups can generally be determined by $^{13}C$ NMR spectroscopy.

Comonomers used are preferably compounds having at least two amino functions. Suitable comonomers which may be mentioned as examples are alkylenediamines having from 2 to 10 carbon atoms in the alkylene radical, preferably ethylenediamine or propylenediamine. Other suitable comonomers are diethylenetriamine, triethylenetetramine, tetraethylenepentamine, dipropylenetriamine, tripropylenetetramine, dihexamethylenetriamine, aminopropylethylenediamine and bisaminopropylethylenediamine.

Polyethyleneimines usually have an average molecular weight (weight-average) of from 100 to 3,000,000, preferably from 800 to 2,000,000 (determined by light scattering). The viscosity to ISO 2555 (at 20° C.) is generally within the range from 100 to 200,000 mPas, preferably from 1000 to 100,000 mPas.

Other suitable polyethyleneimines are crosslinked polyethyleneimines obtainable by reacting polyethyleneimines with bi- or polyfunctional crosslinkers having, as functional group, at least one halohydrin, glycidyl, aziridine, or isocyanate unit, or a halogen atom. Examples which may be mentioned are epichlorohydrin, and bischlorohydrin ethers of polyalkylene glycols having from 2 to 100 units of ethylene oxide and/or of propylene oxide, and also the compounds listed in DE-A 19 93 17 20 and U.S. Pat. No. 4,144,123. Processes for preparing crosslinked polyethyleneimines are known, for example from the abovementioned publications, and also EP-A 895 521 and EP-A 25 515.

Grafted polyethyleneimines are also suitable, and the grafting agents used here may be any compounds which can react with the amino and/or imino groups of the polyethyleneimines. Suitable grafting agents and processes for preparing grafted polyethyleneimines are found in EP-A-675 914, for example.

Other suitable polyethyleneimines for the purposes of the invention are amidated polymers, usually obtainable by reacting polyethyleneimines with carboxylic acids, their esters or anhydrides, carboxamides, or carbonyl halides. Depending on the proportion of amidated nitrogen atoms in the polyethyleneimine chain, the amidated polymers may subsequently be crosslinked using the crosslinkers mentioned. It is preferable here for up to 30% of the amino functions to be amidated, so that there are still sufficient primary and/or secondary nitrogen atoms available for a subsequent crosslinking reaction.

Alkoxylated polyethyleneimines are also suitable, and are obtainable by reacting polyethyleneimine with ethylene oxide and/or with propylene oxide, for example. These alkoxylated polymers, too, may be subsequently crosslinked.

Polyethyleneimines containing hydroxyl groups, and amphoteric polyethyleneimines (incorporating anionic groups) may also be mentioned as other suitable polyethyleneimines of the invention, as may lipophilic polyethyleneimines, which are generally obtained by incorporating long-chain hydrocarbon radicals into the polymer chain. Processes for preparing polyethyleneimines of this type are known to the skilled worker, and it is therefore unnecessary to give further details in this connection.

As component C), the molding compositions of the invention may comprise from 0 to 70% by weight, preferably from 0 to 30% by weight, of other additives.

Suitable sterically hindered phenols C) are in principle any of the compounds having a phenolic structure and having at least one bulky group on the phenolic ring.

Examples of compounds whose use is preferred are those of the formula

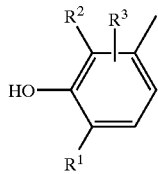

where:
R¹ and R² are alkyl, substituted alkyl or a substituted triazole group, where R¹ and R² may be identical or different, and R³ is alkyl, substituted alkyl, alkoxy or substituted amino.

Antioxidants of the type mentioned are described, for example, in DE-A 27 02 661 (U.S. Pat. No. 4,360,617).

Another group of preferred sterically hindered phenols derives from substituted benzenecarboxylic acids, in particular from substituted benzenepropionic acids.

Particularly preferred compounds of this class have the formula

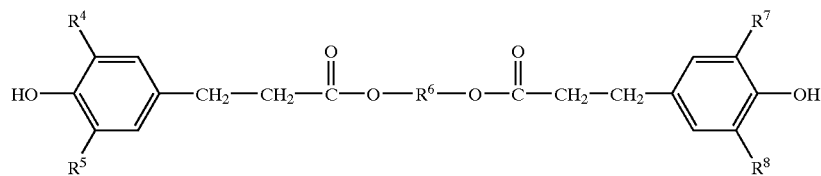

where $R^4$, $R^5$, $R^7$ and $R^8$, independently of one another, are $C_1$–$C_8$-alkyl which may in turn have substitution (at least one of these is a bulky group) and $R^6$ is a bivalent aliphatic radical which has from 1 to 10 carbon atoms and may also have C—O bonds in its main chain.

Preferred compounds of this formula are

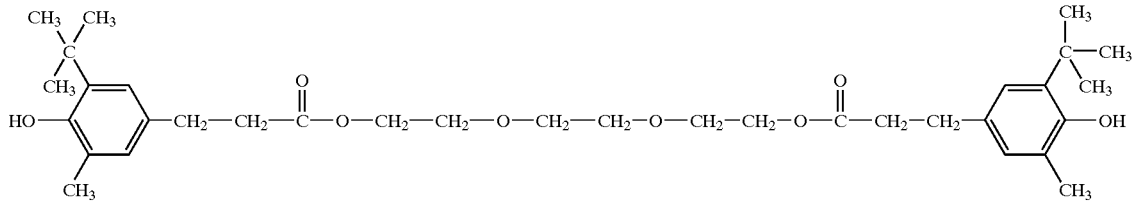

(Irganox® 245 from Ciba-Geigy)

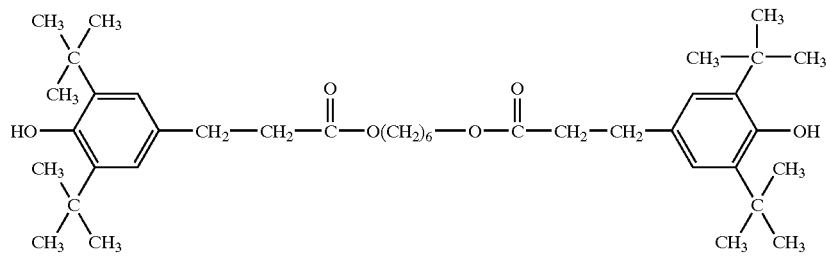

(Irganox® 245 from Ciba-Geigy)

The examples of sterically hindered phenols which should be mentioned are:
2,2'-methylenebis(4-methyl-6-tert-butylphenol), 1,6-hexanediol bis[3-(3,5-di-tert-butyl-4-hydroxyphenyl)propionate], pentaerythritol tetrakis[3-(3,5-di-tert-butyl-4-hydroxyphenyl)propionate], distearyl 3,5-di-tert-butyl-4-hydroxybenzylphosphonate, 2,6,7-trioxa-1-phosphabicyclo[2.2.2]oct-4-ylmethyl 3,5-di-tert-butyl-4-- hydroxyhydrocinnamate, 3,5-di-tert-butyl-4-hydroxyphenyl-3,5-distearylthiotriazylamine, 2-(2'-hydroxy-3'-hydroxy-3',5'-di-tert-butylphenyl)-5-chlorobenzotriazole, 2,6-di-tert-butyl-4-hydroxymethylphenol, 1,3,5-trimethyl-2,4,6-tris(3,5-di-tert-butyl-4-hydroxybenzyl)benzene, 4,4'-methylenebis(2,6-di-tert-butylphenol), 3,5-di-tert-butyl-4-hydroxybenzyldimethylamine and N,N'-hexamethylenebis-3,5-di-tert-butyl-4-hydroxyhydrocinnamide.

Compounds which have proven especially effective and which are therefore preferably used are 2,2'-methylenebis (4-methyl-6-tert-butylphenyl) [sic], 1,6-hexanediol bis(3,5-di-tert-butyl-4-hydroxyphenyl]propionate (Irganox® 259), pentaerythritol tetrakis[3-(3,5-di-tert-butyl-4-hydroxyphenyl)propionate] and the Irganox® 245 described above from Ciba Geigy, which is particularly suitable.

The amounts present of the antioxidants (C), which may be used individually or as mixtures, are usually up to 2% by weight, preferably from 0.005 to 2% by weight, in particular from 0.1 to 1% by weight, based on the total weight of the molding compositions A) to C).

Sterically hindered phenols which have proven particularly advantageous, in particular when assessing color stability on storage in diffuse light over prolonged periods, in some cases have no more than one sterically hindered group in the ortho position to the phenolic hydroxyl.

The polyamides which can be used as components C) are known per se. Use may be made of partly crystalline or amorphous resins as described, for example, in the Encyclopedia of Polymer Science and Engineering, Vol. 11, John Wiley & Sons, Inc., 1988, pp. 315–489. The melting point of the polyamide here is preferably below 225° C., and particularly preferably below 215° C.

Examples of these are polyhexamethylene azelamide, polyhexamethylene sebacamide, polyhexamethylene dodecanediamide, poly-11-aminoundecanamide and bis(p-aminocyclohexyl)methyldodecanediamide, and the products obtained by ring-opening of lactams, for example polylaurolactam. Other suitable polyamides are based on terephthalic or isophthalic acid as acid component and trimethylhexamethylenediamine or bis(p-aminocyclohexyl)propane as diamine component and polyamide base resins prepared by copolymerizing two or more of the abovementioned polymers or components thereof.

Particularly suitable polyamides which may be mentioned are copolyamides based on caprolactam, hexamethylenediamine, p,p'-diaminodicyclohexylmethane and adipic acid. An example of these is the product marketed by BASF Aktiengesellschaft under the name Ultramid® 1 C.

Other suitable polyamides are marketed by Du Pont under the name Elvamide®.

The preparation of these polyamides is also described in the abovementioned text. The ratio of terminal amino groups to terminal acid groups can be controlled by varying the molar ratio of the starting compounds.

The proportion of the polyamide in the molding composition of the invention is up to 2% by weight, by preference from 0.005 to 1.99% by weight, preferably from 0.01 to 0.08% by weight.

The dispersibility of the polyamides used can be improved in some cases by concomitant use of a polycondensation product made from 2,2-di(4-hydroxyphenyl)propane (bisphenol A) and epichlorohydrin.

Condensation products of this type made from epichlorohydrin and bisphenol A are commercially available. Processes for their preparation are also known to the person skilled in the art. Tradenames of the polycondensates are Phenoxy® (Union Carbide Corporation) and Epikote® (Shell). The molecular weight of the polycondensates can vary within wide limits. In principle, any of the commercially available grades is suitable.

Other stabilizers which may be present in the polyoxymethylene molding compositions of the invention are one or more alkaline earth metal silicates and/or alkaline earth metal glycerophosphates in amounts of up to 2.0% by weight, preferably from 0.005 to 0.5% by weight and in particular from 0.01 to 0.3% by weight, based on the total weight of the molding compositions. Alkaline earth metals which have proven preferable for forming the silicates and glycerophosphates are calcium and, in particular, magnesium. Useful compounds are calcium glycerophosphate and preferably magnesium glycerophosphate and/or calcium silicate and preferably magnesium silicate. Particularly preferable alkaline earth silicates here are those described by the formula

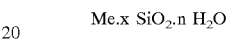

Me.x $SiO_2$.n $H_2O$ where:

Me is an alkaline earth metal, preferably calcium or in particular magnesium, x is a number from 1.4 to 10, preferably from 1.4 to 6, and n is greater than or equal to 0, preferably from 0 to 8.

The compounds are advantageously used in finely ground form. Particularly suitable products have an average particle size of less than 100 μm, preferably less than 50 μm.

Preference is given to the use of calcium silicates and magnesium silicates and/or calcium glycerophosphates and magnesium glycerophosphates. Examples of these may be defined more precisely by the following characteristic values:

Calcium silicate and magnesium silicate, respectively: content of CaO and MgO, respectively: from 4 to 32% by weight, preferably from 8 to 30% by weight and in particular from 12 to 25% by weight, ratio of $SiO_2$ to CaO and $SiO_2$ to MgO, respectively (mol/mol): from 1.4 to 10, preferably from 1.4 to 6 and in particular from 1.5 to 4, bulk density: from 10 to 80 g/100 ml, preferably from 10 to 40 g/100 ml, and average particle size: less than 100 μm, preferably less than 50 μm.

Calcium glycerophosphates and magnesium glycerophosphates, respectively:

content of CaO and MgO, respectively: above 70% by weight, preferably above 80% by weight, residue on ashing: from 45 to 65% by weight, melting point: above 300° C., and average particle size: less than 100 μm, preferably less than 50 μm.

Preferred lubricants C) which may be present in the molding compositions of the invention are, in amounts of up to 5 [lacuna], preferably from 0.09 to 2 [lacuna] and in particular from 0.1 to 0.7 [lacuna], at least one ester or amide of saturated or unsaturated aliphatic carboxylic acids having from 10 to 40 carbon atoms, preferably from 16 to 22 carbon atoms, with polyols or with saturated aliphatic alcohols or amines having from 2 to 40 carbon atoms, preferably from 2 to 6 carbon atoms, or with an ether derived from alcohols and ethylene oxide.

The carboxylic acids may be mono- or dibasic. Examples which may be mentioned are pelargonic acid, palmitic acid, lauric acid, margaric acid, dodecanedioic acid, behenic acid and, particularly preferably, stearic acid, capric acid and also montanic acid (a mixture of fatty acids having from 30 to 40 carbon atoms).

The aliphatic alcohols may be mono- to tetrahydric. Examples of alcohols are n-butanol, n-octanol, stearyl alcohol, ethylene glycol, propylene glycol, neopentyl glycol and pentaerythritol, and preference is given to glycerol and pentaerythritol.

The aliphatic amines may be mono- to tribasic. Examples of these are stearylamine, ethylenediamine, propylenediamine, hexamethylenediamine and di(6-aminohexyl)amine, and particular preference is given to ethylenediamine and hexamethylenediamine. Correspondingly, preferred esters and amides are glycerol distearate, glycerol tristearate, ethylenediammonium distearate, glycerol monopalmitate, glycerol trilaurate, glycerol monobehenate and pentaerythritol tetrastearate.

It is also possible to use mixtures of different esters or amides or esters with amides combined, in any desired mixing ratio.

Other suitable compounds are polyether polyols and polyester polyols which have been esterified with mono- or polybasic carboxylic acids, preferably fatty acids, or have been etherified. Suitable products are available commercially, for example Loxiol® EP 728 from Henkel KGaA.

Preferred ethers derived from alcohols and ethylene oxide have the formula

RO (CH$_2$ CH$_2$ O)$_n$ H where R is alkyl having from 6 to 40 carbon atoms and n is an integer greater than or equal to 1.

R is particularly preferably a saturated C$_{16}$–C$_{18}$ fatty alcohol with n≈50, obtainable commercially from BASF as Lutensol® AT 50.

The novel molding compositions may comprise from 0 to 5% by 45 weight, preferably from 0.001 to 5% by weight, particularly preferably from 0.01 to 3% by weight and in particular from 0.05 to 1% by weight, of a melamine-formaldehyde condensate. This is preferably a crosslinked, water-insoluble precipitation condensate in finely divided form. The molar ratio of formaldehyde to melamine is preferably from 1.2:1 to 10:1, in particular from 1.2:1 to 2:1. The structure of condensates of this type and processes for their preparation are found in DE-A 25 40 207.

The novel molding compositions may comprise from 0.0001 to 1% by weight, preferably from 0.001 to 0.8% by weight, and in 10 particular from 0.01 to 0.3% by weight, of a nucleating agent as component C).

Possible nucleating agents are any known compounds, for example melamine cyanurate, boron compounds, such as boron nitride, silica, pigments, e.g. Heliogen® Blue (copper phthalocyanine pigment; registered trademark of BASF Aktiengesellschaft), or branched polyoxymethylenes, which in these small amounts have a nucleating action.

Talc in particular is used as a nucleating agent and is a hydrated magnesium silicate of the formula Mg$_3$[(OH)$_2$/Si$_4$O$_{10}$] or MgO.4SiO$_2$.H$_2$O. This is termed a three-layer phyllosilicate and has a triclinic, monoclinic or rhombic crystal structure and a lamella appearance. Other trace elements which may be present are Mn, Ti, Cr, Ni, Na and K, and some of the OH groups may have been replaced by fluoride.

Particular preference is given to the use of talc in which 100% of the particle sizes are <20 μm. The particle size distribution is usually determined by sedimentation analysis and is preferably:

| | |
|---|---|
| <20 μm | 100% by weight |
| <10 μm | 99% by weight |
| <5 μm | 85% by weight |
| <3 μm | 60% by weight |
| <2 μm | 43% by weight |

Products of this type are commercially available as Micro-Talc I.T. extra (Norwegian Talc Minerals).

Examples of fillers which may be mentioned, in amounts of up to 50% by weight, preferably from 5 to 40% by weight, are potassium titanate whiskers, carbon fibers and preferably glass fibers. The glass fibers may, for example, be used in the form of glass wovens, mats, nonwovens and/or glass filament rovings or chopped glass filaments made from low-alkali E glass and having a diameter of from 5 to 200 μm, preferably from 8 to 50 μm. After they have been incorporated, the fibrous fillers preferably have an average length of from 0.05 to 1 μm, in particular from 0.1 to 0.5 μm.

Examples of other suitable fillers are calcium carbonate and glass beads, preferably in ground form, or mixtures of these fillers.

Other additives which may be mentioned are amounts of up to 50% by weight, preferably from 0 to 40% by weight, of impact-modifying polymers (also referred to below as elastomeric polymers or elastomers).

Preferred types of such elastomers are those known as ethylene-propylene (EPM) and ethylene-propylene-diene (EPDM) rubbers.

EPM rubbers generally have practically no residual double bonds, whereas EPDM rubbers may have from 1 to 20 double bonds per 100 carbon atoms.

Examples which may be mentioned of diene monomers for EPDM rubbers are conjugated dienes, such as isoprene and butadiene, non-conjugated dienes having from 5 to 25 carbon atoms, such as 1,4-pentadiene, 1,4-hexadiene, 1,5-hexadiene, 2,5-dimethyl-1,5-hexadiene and 1,4-octadiene, cyclic dienes, such as cyclopentadiene, cyclohexadienes, cyclooctadienes and dicyclopentadiene, and also alkenylnorbornenes, such as 5-ethylidene-2-norbornene, 5-butylidene-2-norbornene, 2-methallyl-5-norbornene and 2-isopropenyl-5-norbornene, and tricyclodienes, such as 3-methyl-tricyclo[5.2.1.0$^{2,6}$]-3,8-decadiene, or mixtures of these. Preference is given to 1,5-hexadiene-5-ethylidenenorbornene [sic] and dicyclopentadiene. The diene content of the EPDM rubbers is preferably from 0.5 bis 50% by weight, in particular from 1 to 8% by weight, based on the total weight of the rubber.

EPOM rubbers may preferably have also been grafted with other monomers, e.g. with glycidyl (meth)acrylates, with (meth)acrylic esters, or with (meth)acrylamides.

Copolymers of ethylene with esters of (meth)acrylic acid are another group of preferred rubbers. The rubbers may also contain monomers having epoxy groups. These monomers containing epoxy groups are preferably incorporated into the rubber by adding, to the monomer mixture, monomers having epoxy groups and the formula I or II

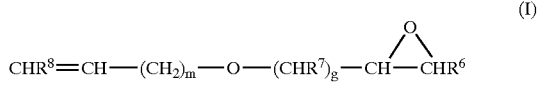

(I)

-continued

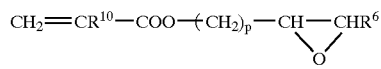
(II)

where $R^6$ to $R^{10}$ are hydrogen or alkyl having from 1 to 6 carbon atoms, and m is an integer from 0 to 20, g is an integer from 0 to 10 and p is an integer from 0 to 5.

$R^6$ to $R^8$ are preferably hydrogen, where m is 0 or 1 and g is 1. The corresponding compounds are allyl glycidyl ether and vinyl glycidyl ether.

Preferred compounds of the formula II are acrylic and/or methacrylic esters having epoxy groups, for example glycidyl acrylate and glycidyl methacrylate.

The copolymers are advantageously composed of from 50 to 98% by weight of ethylene, from 0 to 20% by weight of monomers having epoxy groups, the remainder being (meth)acrylic esters.

Particular preference is given to copolymers made from
from 50 to 98% by weight, in particular from 55 to 95% by weight, of ethylene,
  in particular from 0.3 to 20% by weight of glycidyl acrylate, and/or
from 0 to 40% by weight, in particular from 0.1 to 20% by weight, of glycidyl methacrylate, and
from 1 to 50% by weight, in particular from 10 to 40% by weight, of n-butyl acrylate and/or 2-ethylhexyl acrylate.

Other preferred (meth)acrylates are the methyl, ethyl, propyl, isobutyl and tert-butyl esters.

Besides these, comonomers which may be used are vinyl esters and vinyl ethers.

The ethylene copolymers described above may be prepared by processes known per se, preferably by random copolymerization at high pressure and elevated temperature. Appropriate processes are well known.

Preferred elastomers also include emulsion polymers whose preparation is described, for example, by Blackley in the monograph "Emulsion Polymerization". The emulsifiers and catalysts which may be used are known per se.

In principle it is possible to use homogeneously structured elastomers or those with a shell construction. The shell-type structure is determined, inter alia, by the sequence of addition of the individual monomers. The morphology of the polymers is also affected by this sequence of addition.

Monomers which may be mentioned here, merely as examples, for the preparation of the rubber fraction of the elastomers are acrylates, such as n-butyl acrylate and 2-ethylhexyl acrylate, and corresponding methacrylates, and butadiene and isoprene, and also mixtures of these. These monomers may be copolymerized with other monomers, such as styrene, acrylonitrile, vinyl ethers and with other acrylates or methacrylates, such as methyl methacrylate, methyl acrylate, ethyl acrylate or propyl acrylate.

The soft or rubber phase (with a glass transition temperature of below 0° C.) of the elastomers may be the core, the outer envelope or an intermediate shell (in the case of elastomers whose structure has more than two shells). When elastomers have more than one shell it is also possible for more than one shell to be composed of a rubber phase.

If one or more hard components (with glass transition temperatures above 20° C.) are involved, besides the rubber phase, in the structure of the elastomer, these are generally prepared by polymerizing, as principal monomers, styrene, acrylonitrile, methacrylonitrile, α-methylstyrene, p-methylstyrene, or acrylates or methacrylates, such as methyl acrylate, ethyl acrylate or ethyl methacrylate. Besides these, it is also possible to use relatively small proportions of other comonomers.

It has proven advantageous in some cases to use emulsion polymers which have reactive groups at their surfaces. Examples of groups of this type are epoxy, amino and amide groups, and also functional groups which may be introduced by concomitant use of monomers of the formula

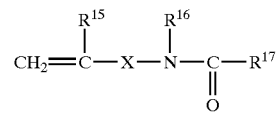

where:
$R^{15}$ is hydrogen or $C_1$–$C_4$-alkyl,
$R^{16}$ is hydrogen, $C_1$–$C_8$-alkyl or aryl, in particular phenyl,
$R^{17}$ is hydrogen, $C_1$–$C_{10}$-alkyl, $C_6$–$C_{12}$-aryl or —$OR^{18}$.
$R^{18}$ is $C_1$–$C_8$-alkyl or $C_6$–$C_{12}$-aryl, if desired with substitution by O— or N-containing groups,
X is a chemical bond, $C_1$–$C_{10}$-alkylene or $C_6$–$C_{12}$-arylene, or

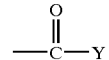

[lacuna]

The graft monomers described in EP-A 208 187 are also suitable for introducing reactive groups at the surface.

Other examples which may be mentioned are acrylamide, methacrylamide and substituted acrylates or methacrylates, such as (N-tert-butylamino)ethyl methacrylate, (N,N-dimethylamino)ethyl acrylate, (N,N-dimethylamino)methyl acrylate and (N,N-diethylamino)ethyl acrylate.

The particles of the rubber phase may also have been crosslinked. Examples of crosslinking monomers are 1,3-butadiene, divinylbenzene, diallyl phthalate, butanediol diacrylate and dihydrodicyclopentadienyl acrylate, and also the compounds described in EP A 50 265.

It is also possible to use the monomers known as graft-linking monomers, i.e. monomers having two or more polymerizable double bonds which react at different rates during the polymerization. Preference is given to the use of those compounds in which at least one reactive group polymerizes at about the same rate as the other monomers, while the other reactive group (or reactive groups), for example, polymerize(s) significantly more slowly. The different polymerization rates give rise to a certain proportion of unsaturated double bonds in the rubber. If another phase is then grafted onto a rubber of this type, at least some of the double bonds present in the rubber react with the graft monomers to form chemical bonds, i.e. the phase grafted on has at least some degree of chemical bonding to the graft base.

Examples of graft-linking monomers of this type are monomers containing allyl groups, in particular allyl esters of ethylenically unsaturated carboxylic acids, for example allyl acrylate, allyl methacrylate, diallyl maleate, diallyl fumarate and diallyl itaconate, and the corresponding monoallyl compounds of these dicarboxylic acids. Besides these there is a wide variety of other suitable graft-linking monomers. For further details reference may be made here, for example, to U.S. Pat. No. 4,148,846.

The proportion of these crosslinking monomers in component C) is generally up to 5% by weight, preferably not more than 3% by weight, based on C).

Some preferred emulsion polymers are listed below. Mention is made firstly of graft polymers with a core and with at least one outer shell and the following structure:

| Monomers for the core | Monomers for the envelope |
| --- | --- |
| 1,3-butadiene, isoprene, n-butyl acrylate, ethylhexyl acrylate or a mixture of these, where appropriate together with crosslinking monomers | Styrene, acrylonitrile, (meth)acrylate, where appropriate having reactive groups, as described herein |

Instead of graft polymers whose structure has more than one shell it is also possible to use homogeneous, i.e. single-shell, elastomers made from 1,3-butadiene, isoprene and n-butyl acrylate or from copolymers of these. These products, too, may be prepared by concomitant use of crosslinking monomers or of monomers having reactive groups.

The elastomers C) described may also be prepared by other conventional processes, e.g. by suspension polymerization.

Other suitable elastomers which may be mentioned are thermoplastic polyurethanes, as described in EP-A 115 846, EP-A 115 847, and EP-A 117 664, for example.

It is, of course, also possible to use mixtures of the rubber types listed above.

The molding compositions of the invention may also comprise other conventional additives and processing aids. Merely by way of example, mention may be made here of additives for scavenging formaldehyde (formaldehyde scavengers), plasticizers, coupling agents, and pigments. The proportion of additives of this type is generally within the range from 0.001 to 5% by weight.

The thermoplastic molding compositions of the invention are prepared by mixing the components in a manner known per se, and it is therefore unnecessary to give detailed information in this connection. It is advantageous to mix the components in an extruder.

In one preferred preparation method, component B), and also, where appropriate, component(s) C) may preferably be applied at room temperature to the pellets of A), followed by extrusion.

The molding compositions can be used to produce moldings (or semifinished products, films, sheeting or foams) of any type. The molding compositions have improved stability when exposed to high temperatures, together with good color properties (despite the addition of a nitrogen-containing compound), and also improved diesel-fuel resistance. Moldings of this type are therefore particularly suitable for use as chain links, casters, slide rails, gear wheels, diesel-fuel resistant moldings in the engine of a motor vehicle, or else engine compartment or bearing elements for the power train or steering areas of a motor vehicle, for example fuel-extraction equipment, rollover valves, diesel fuel outputs [sic], negative-pressure valves, holders for diesel fuel pumps, pump housings, internal parts for diesel fuel pumps, and in particular rotors and starters [sic] in the electric motor.

EXAMPLES

The following components were used:

Component A)

Polyoxymethylene copolymer made from 97.3% by weight of trioxane and 2.7% by weight of butanediol formal. The product also comprised about 3% by weight of unconverted trioxane and 5% by weight of thermally unstable fractions. After degradation of the thermally unstable fractions the copolymer had an MVR of 2.2 ml/10 min (190° C., 2.16 kg, to ISO 1133/B).

Component B)

| | Active ingredient content (aqueous solution) % | Viscosity (20° C.) mPa*s Iso 2555 | Molecular weight ($M_w$) by light scattering |
| --- | --- | --- | --- |
| B1 | >98 | about 300 | 800 |
| B2 | about 50 | about 1200 | 5000 |
| B3 | about 50 | about 14,000 | 35,000 |
| B4 | about 50 | about 24,000 | 750,000 |
| B5 | about 33 | about 1400 | 750,000 |
| B6 | about 24 | about 750 | 2,000,000 |
| B7 | about 50 | ? ? | ? ? |

Components C)

C/1 Irganox® 245 from Ciba Geigy:

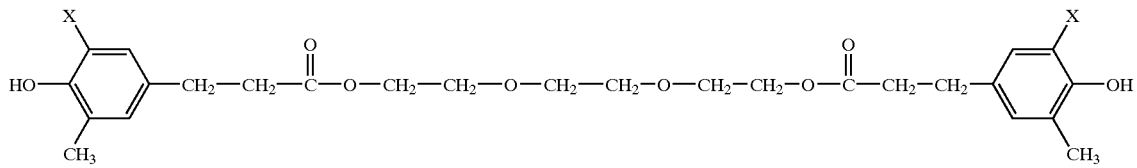

C/2 polyamide oligomer with molecular weight about 3000, prepared from caprolactam, hexamethylenediamine, adipic acid and propionic acid (as molecular weight regulator) by analogy with Examples 5–4 of U.S. Pat. No. 3,960,984 ("PA-dicapped").

C/3 Synthetic Mg silicate (Ambosol® from Societe Nobel, Puteaux) with the following properties:

| | |
|---|---|
| MgO content | ≧14.8% by weight |
| SiO$_2$ content | ≧59% by wt |
| Ratio SiO$_2$:MgO | 2.7 mol/mol |
| Bulk density | from 20 to 30 g/100 m [sic] |
| Loss on ashing | <25% by weight |

C/4 A melamine-formaldehyde condensate as in Example 1 of DE-A 25 40 207.

To prepare the molding compositions, component A was mixed with the amounts given in the table of C and B in a dry-mixer at 23° C.

The components were homogenized in a twin-screw vented extruder (Werner & Pfleiderer ZSK 30) at 220° C., and the homogenized mixture was extruded through a die in the form of a strand, and pelletized. The test specimens were produced at 190° C.

The following were determined to test thermal stability:

| | |
|---|---|
| WL N$_2$: | weight loss in percent of a specimen of 1.2 g of pellets on heating to 220° C. in nitrogen for 2 hours. |
| WL air: | weight loss in percent of a specimen of 1.2 g of pellets on heating to 220° C. in air for 2 hours. |

Color measurements to DIN 5033:

ΔE ≙ total color difference to DIN 6174

ΔL ≙ deviation in the light-dark direction

Δa ≙ red-green deviation

Δb ≙ blue-yellow deviation

The preceding sign +/− defines the deviation with respect to the standard or reference point. The reference point in this case was a white standard.

| | |
|---|---|
| ΔL | + lighter |
| | − darker |
| Δa | + redder |
| | − greener |
| Δb | + yellower |
| | − bluer |

The total color difference ΔE is calculated as follows:

$$\Delta E = \sqrt{\Delta L^2 + \Delta a^2 + \Delta b^2}$$

Illumination and viewing conditions:
1. Specimen size: unrestricted
   Optical measuring head with downward-facing aperture: maximum 165.1 mm from the rim to the center line of the beam
2. Diameter of illuminated area:
   Standard: 44 mm
3. Diameter of aperture:
   Standard: 50 mm
4. Incident beam cross-sectional angle −0° to normal specimen
   Subtended (field) angle −22° for an illuminated area of diameter 44 mm
5. Reflective (viewed) beam—circumferential
   Cross-sectional angle −45° to normal specimen
   Subtended (field) angle −24° for an illuminated area of diameter 44 mm
   Specular reflection excluded
   Diesel-fuel resistance The materials were stored in winter diesel fuel from Haltermann, CFPP extending to −22° C., storage time 300 h, storage temperature generally 90° C. (deviations have been indicated). 5 POM disks of 2 mm thickness and 60 mm diameter with a sprue (total surface area 405 cm$^2$) were placed in a glass vessel with 2 l of diesel fuel, the vessel having a reflux condenser. The disks have been joined at the upper end of the sprue in such a way that they could not touch one another and in such a way as to ensure that fuel passed over their entire surface. After 300 h of storage the disks were removed, placed on a highly absorbent non-fluffing cloth and left at RT for 4 hours until excess liquid had been removed. The unit of 5 disks joined together was then weighed and the weight loss determined. After the first weighing following air-drying the disks were dried for 24 h at 90° C. in a circulating-air drying cabinet and again weighed.

The results of the measurements and the mixing specifications for the molding compositions are given in Tables 1–4.

TABLE 1

Mixing specification

| Example | | Comparison 1 | 1 | 2 | 3 | 4 | 5 | 6 | 7 | 8 |
|---|---|---|---|---|---|---|---|---|---|---|
| A | % by weight | 99.36 | 99.3995 | 99.399 | 99.3995 | 99.399 | 99.3995 | 99.399 | 99.3995 | 99.399 |
| C/1 | % by weight | 0.35 | 0.35 | 0.35 | 0.35 | 0.35 | 0.35 | 0.35 | 0.35 | 0.35 |
| C/2 | % by weight | 0.04 | | | | | | | | |
| C/3 | % by weight | 0.05 | 0.05 | 0.05 | 0.05 | 0.05 | 0.05 | 0.05 | 0.05 | 0.05 |
| C/4 | % by weight | 0.2 | 0.2 | 0.2 | 0.2 | 0.2 | 0.2 | 0.2 | 0.2 | 0.2 |

TABLE 1-continued

| Example | | Comparison 1 | 1 | 2 | Mixing specification 3 | 4 | 5 | 6 | 7 | 8 |
|---|---|---|---|---|---|---|---|---|---|---|
| B7 | % by weight | | 0.0005 | 0.001 | | | | | | |
| B3 | % by weight | | | | 0.0005 | 0.001 | | | | |
| B6 | % by weight | | | | | | 0.0005 | 0.0010 | | |
| B5 | % by weight | | | | | | | | 0.0005 | 0.0010 |
| $N_2$ | [%] | 0.26 | 0.10 | 0.09 | 0.12 | 0.07 | 0.09 | 0.09 | 0.01 | 0.04 |
| Air | [%] | 2.09 | 1.38 | 1.24 | 1.50 | 1.00 | 1.57 | 1.24 | 1.04 | 1.16 |
| Delta E | | 10.38 | 9.24 | 9.47 | 9.33 | 9.34 | 7.49 | 7.88 | 8.30 | 9.39 |

TABLE 2

| Example | | Mixing specification | | | | | |
|---|---|---|---|---|---|---|---|
| | | 9 | 10 | 11 | 12 | 13 | 14 |
| A | % by weight | 99.3995 | 99.399 | 99.3995 | 99.399 | 99.3995 | 99.399 |
| C/1 | % by weight | 0.35 | 0.35 | 0.35 | 0.35 | 0.35 | 0.35 |
| C/2 | % by weight | | | | | | |
| C/3 | % by weight | 0.05 | 0.05 | 0.05 | 0.05 | 0.05 | 0.05 |
| C/4 | % by weight | 0.2 | 0.2 | 0.2 | 0.2 | 0.2 | 0.2 |
| B4 | % by weight | 0.0005 | 0.001 | | | | |
| B1 | % by weight | | | 0.0005 | 0.001 | | |
| B2 | % by weight | | | | | 0.0005 | 0.001 |
| $N_2$ | [%] | 0.23 | 0.04 | 0.11 | 0.10 | 0.10 | 0.06 |
| Air | [%] | 1.77 | 1.49 | 1.36 | 1.31 | 2.23 | 1.36 |
| Delta E | | 8.11 | 8.21 | 8.83 | 8.45 | 9.28 | 9.47 |

TABLE 3

| Example | | Comparison 1 | Comparison 2 | 18/28 Mixing specification 1 | 2 | 3 | 4 | 5 | 6 | 7 | 8 |
|---|---|---|---|---|---|---|---|---|---|---|---|
| A | % by weight | 99.36 | 99.36 | 99.31 | 99.26 | 99.16 | 99.31 | 99.26 | 99.16 | 99.31 | 99.26 |
| C/1 | % by weight | 0.35 | 0.35 | 0.35 | 0.35 | 0.35 | 0.35 | 0.35 | 0.35 | 0.35 | 0.35 |
| C/2 | % by weight | 0.04 | 0.04 | 0.04 | 0.04 | 0.04 | 0.04 | 0.04 | 0.04 | 0.04 | 0.04 |
| C/3 | % by weight | 0.05 | 0.05 | 0.05 | 0.05 | 0.05 | 0.05 | 0.05 | 0.05 | 0.05 | 0.05 |
| C/4 | % by weight | 0.2 | 0.2 | 0.2 | 0.2 | 0.2 | 0.2 | 0.2 | 0.2 | 0.2 | 0.2 |
| B1 | % by weight | | | 0.05 | 0.1 | 0.2 | | | | | |
| B2 | % by weight | | | | | | 0.05 | 0.1 | 0.2 | | |
| B3 | % by weight | | | | | | | | | 0.05 | 0.1 |
| Degradation | [%] | −13.65 | −12.94 | −0.09 | 0.1 | 0.08 | 0.02 | 0.02 | −0.01 | −0.13 | −0.07 |

TABLE 4

Mixing specification

| Example | | 9 | 10 | 11 | 12 | 13 | 14 | 15 | 16 | 17 |
|---|---|---|---|---|---|---|---|---|---|---|
| A | % by weight | 99.31 | 99.26 | 99.160 | 99.31 | 99.26 | 99.16 | 99.31 | 99.26 | 99.16 |
| C/1 | % by weight | 0.35 | 0.35 | 0.35 | 0.35 | 0.35 | 0.35 | 0.35 | 0.35 | 0.35 |
| C/2 | % by weight | 0.04 | 0.04 | 0.04 | 0.04 | 0.04 | 0.04 | 0.04 | 0.04 | 0.04 |
| C/3 | % by weight | 0.05 | 0.05 | 0.05 | 0.05 | 0.05 | 0.05 | 0.05 | 0.05 | 0.05 |
| C/4 | % by weight | 0.2 | 0.2 | 0.2 | 0.2 | 0.2 | 0.2 | 0.2 | 0.2 | 0.2 |
| B4 | % by weight | 0.05 | 0.1 | 0.2 | | | | | | |
| B5 | % by weight | | | | 0.05 | 0.1 | 0.2 | | | |
| B6 | % by weight | | | | | | | 0.05 | 0.1 | 0.2 |
| Degradation | | −0.15 | 0.31 | 0.31 | −1.19 | −0.1 | 0.37 | −2.97 | −0.48 | 0.1 |

We claim:

1. A thermoplastic molding composition comprising, as substantive components,
   A) from 29% by weight to (100% minus 1 ppb) of at least one thermoplastic polyoxymethylene homo- or copolymer,
   B) from 1 ppb to 1% by weight of at least one polyethyleneimine homo- or copolymer, and also
   C) from 0 to 70% by weight of other additives, where the percentages by weight of components A) to C) always give 100%.

2. A thermoplastic molding composition as claimed in claim 1, where the polyethyleneimine polymers are selected from the group consisting of
   homopolymers of ethyleneimine,
   copolymers of ethyleneimine and amines having at least two amino groups,
   crosslinked polyethyleneimines,
   grafted polyethyleneimines,
   amidated polymers obtainable by reacting polyethyleneimines with carboxylic acids or with carboxylic esters, with carboxylic anhydrides, with carboxamides, or with carbonyl halides,
   alkoxylated polyethyleneimines,
   polyethyleneimines containing hydroxyl groups,
   amphoteric polyethyleneimines, and
   lipophilic polyethyleneimines.

3. A thermoplastic molding composition as claimed in claim 1, where the proportion of the polyethyleneimine polymers (B) is from 1 ppm to 0.1% by weight.

4. A molding, film, fiber or foam obtained from the thermoplastic molding compositions as claimed in claim 1.

5. A process for increasing thermal stability and or diesel-fuel resistance, which comprises adding from 1 ppb to 1% by weight of a polyethyleneimine homo- or copolymer to a polyoxymethylene homo- or copolymer A).

* * * * *

UNITED STATES PATENT AND TRADEMARK OFFICE
CERTIFICATE OF CORRECTION

PATENT NO.         : 7,008,986 B2
APPLICATION NO. : 10/312780
DATED              : March 7, 2006
INVENTOR(S)        : Dames et al.

It is certified that error appears in the above-identified patent and that said Letters Patent is hereby corrected as shown below:

Claim 5: Column 28, indicated line 38, "and or" should read --and/or--

Signed and Sealed this

Third Day of April, 2007

JON W. DUDAS
*Director of the United States Patent and Trademark Office*